United States Patent
Liang (10) Patent No.: US 11,182,014 B2
(45) Date of Patent: Nov. 23, 2021

(54) TOUCH CONTROL AUXILIARY APPARATUS, PROTECTIVE CASING, TOUCH SCREEN AND MOBILE TERMINAL

(71) Applicant: BOE Technology Group Co., Ltd., Beijing (CN)

(72) Inventor: Yao Liang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/649,190

(22) PCT Filed: Mar. 15, 2019

(86) PCT No.: PCT/CN2019/078294
§ 371 (c)(1),
(2) Date: Mar. 20, 2020

(87) PCT Pub. No.: WO2019/233154
PCT Pub. Date: Dec. 12, 2019

(65) Prior Publication Data
US 2020/0218419 A1 Jul. 9, 2020

(30) Foreign Application Priority Data
Jun. 7, 2018 (CN) .......................... 201810582173.7

(51) Int. Cl.
*G06F 3/041* (2006.01)
*H04M 1/02* (2006.01)

(52) U.S. Cl.
CPC ...... *G06F 3/04162* (2019.05); *G06F 3/04164* (2019.05); *H04M 1/0266* (2013.01); *H04M 2250/22* (2013.01)

(58) Field of Classification Search
CPC ............ G06F 3/04162; G06F 3/04164; H04M 1/0266; H04M 2250/22
See application file for complete search history.

(56) References Cited

U.S. PATENT DOCUMENTS

2006/0256090 A1* 11/2006 Huppi ............... A63F 13/02
345/173
2014/0055363 A1* 2/2014 Meierling ........... G06F 1/1662
345/169
(Continued)

FOREIGN PATENT DOCUMENTS

CN 103083906 A 5/2013
CN 103246403 A 8/2013
(Continued)

OTHER PUBLICATIONS

International search report of PCT application No. PCT/CN2019/078294 dated May 24, 2019.
(Continued)

*Primary Examiner* — Lisa S Landis
(74) *Attorney, Agent, or Firm* — Fay Sharpe LLP (57) ABSTRACT

A touch control auxiliary apparatus, protective casing, touch screen and mobile terminal. The touch control auxiliary apparatus comprises: a main body having a touch screen contact surface and a finger sliding surface; a plurality of control lines insulated from one another, the plurality of control lines are in the main body, orthogonal projections of the plurality of control lines onto the touch screen contact surface are parallel to one another, the plurality of control lines are in a same plane, and the plane where the plurality of control lines are located is not coplanar with the finger sliding surface; and a plurality of touch lines insulated from one another, wherein the plurality of touch lines are in the finger sliding surface and the plurality of touch lines are parallel to one another, and the plurality of touch lines are connected to the plurality of control lines in a one-to-one correspondence.

20 Claims, 9 Drawing Sheets

(56) References Cited

U.S. PATENT DOCUMENTS

| | | | |
|---|---|---|---|
| 2014/0354902 A1* | 12/2014 | Shih | G06F 3/0446 349/12 |
| 2015/0177783 A1 | 6/2015 | Bragin | |
| 2015/0370406 A1 | 12/2015 | Yue | |
| 2016/0320810 A1 | 11/2016 | Kim et al. | |

FOREIGN PATENT DOCUMENTS

| | | |
|---|---|---|
| CN | 103838381 A | 6/2014 |
| CN | 103984455 A | 8/2014 |
| CN | 104010053 A | 8/2014 |
| CN | 104216543 A | 12/2014 |
| CN | 106094977 A | 11/2016 |
| CN | 107888744 A | 4/2018 |
| CN | 108733271 A | 11/2018 |
| JP | 2002-132445 A | 5/2002 |

OTHER PUBLICATIONS

First office action of Chinese application No. 201810582173.7 dated Nov. 15, 2019.

Second office action of Chinese application No. 201810582173.7 dated May 8, 2020.

* cited by examiner

TOUCH CONTROL AUXILIARY APPARATUS, PROTECTIVE CASING, TOUCH SCREEN AND MOBILE TERMINAL

The present application is a 371 of PCT/CN2019/078294 filed Mar. 15, 2019, which claims priority to Chinese Patent Application No. 201810582173.7, filed on Jun. 7, 2018 and entitled "SIDE TOUCH CONTROL APPARATUS, PROTECTIVE CASING, TOUCH SCREEN AND MOBILE TERMINAL", which is incorporated herein by reference in its entirety.

TECHNICAL FIELD

The present disclosure relates to the technical field of touch control, and more particular to a touch control auxiliary apparatus, a protective casing, a touch screen and a mobile terminal.

BACKGROUND

With the popularity of mobile terminals, mobile terminal devices represented by mobile phones have become indispensable articles in people's daily lives.

In the process of using a mobile phone and other mobile terminals, a user needs to perform sliding operations frequently on a touch screen to trigger functions such as brightness adjustment, volume adjustment, page turning, information refreshing, or the like. Since the touch control function of the existing mobile terminals is implemented by a touch screen, a user needs to perform a touch operation on the touch screen.

SUMMARY

At least one embodiment of the present disclosure provides a touch control auxiliary apparatus, a protective casing, a touch screen and a mobile terminal.

At least one embodiment of the present disclosure provides a touch control auxiliary apparatus. The touch control auxiliary apparatus includes a main body, a plurality of control lines insulated from one another and a plurality of touch lines insulated from one another. The main body has a touch screen contact surface and a finger sliding surface. The plurality of control lines are located in the main body, and orthogonal projections of the plurality of control lines onto the touch screen contact surface are parallel to one another, the plurality of control lines are located in a same plane, and the plane where the plurality of control lines are located is not coplanar with the finger sliding surface. The plurality of touch lines are located in the finger sliding surface and the plurality of touch lines are parallel to one another, and the plurality of touch lines are connected to the plurality of control lines in a one-to-one correspondence.

In some embodiments, the plane where the plurality of control lines are located intersects with the finger sliding surface.

Optionally, a length direction of the control lines intersects with the finger sliding surface.

Optionally, a length direction of the touch lines is parallel to the touch screen contact surface.

Optionally, the finger sliding surface is a planar surface or a curved surface.

In some embodiments, the finger sliding surface is a planar surface, and the finger sliding surface is parallel to the plane where the plurality of control lines are located.

In some embodiments, the main body includes a cover plate and a side wall, the side wall meets the cover plate at one side of the cover plate, the touch screen contact surface is a surface of the cover plate, and the finger touch surface is a surface of the side wall.

Optionally, the side wall has a side wall contact surface opposite to the finger sliding surface, and the side wall contact surface is in contact with the touch screen contact surface.

Optionally, the touch lines are connected to corresponding control lines through connection lines, and the connection lines are located inside the side wall; or the connection lines have a first portion located inside the side wall and a second portion located on the side wall contact surface.

In some embodiments, the main body includes a cover plate, a side wall, and a back plate; the cover plate and the back plate are connected to two opposite side edges of the side wall, respectively, and the cover plate and the back plate are located on a same side of the side wall; the touch screen contact surface is a surface of the cover plate close to the back plate; and the finger touch surface is a surface of the back plate away from the cover plate.

In some embodiments, the cover plate is a transparent cover plate.

In some embodiments, the control lines are transparent conductive lines.

In some embodiments, the cover plate is rotatably connected to the side wall.

Optionally, the plane where the plurality of control lines are located is parallel to or coincides with the touch screen contact surface.

In some embodiments, a distance between adjacent control lines is less than 3.5 mm.

In some embodiments, a width of each control line is less than 3.5 mm.

In some embodiments, the touch screen contact surface has adhesiveness, or the touch screen contact surface has a non-slip structure.

In some embodiments, the touch control auxiliary apparatus further includes a fixing structure connected to the main body, and the fixing structure is configured to fix the touch control auxiliary apparatus to an electronic device to which the touch screen belongs.

Exemplarily, the fixing structure includes a clamping portion, and the clamping portion and the main body constitute a U-shaped structure together.

Exemplarily, the clamping portion is a flexible component.

At least one embodiment of the present disclosure provides a protective casing, and the protective casing includes the aforementioned touch control auxiliary apparatus.

At least one embodiment of the present disclosure provides a touch screen, and the touch screen includes the aforementioned touch control auxiliary apparatus.

At least one embodiment of the present disclosure provides a mobile terminal, and the mobile terminal includes the aforementioned touch screen.

DETAILED DESCRIPTION

The embodiments of the present disclosure will be described in further detail with reference to the accompanying drawings, to present the principles and advantages of the present disclosure more clearly.

The embodiments of the present disclosure provides a touch control auxiliary apparatus. With the touch control auxiliary apparatus, a sliding operation on a touch screen can be achieved without sliding a finger directly on the surface of the touch screen. The touch control auxiliary apparatus includes a main body, a plurality of control lines insulated from one another and a plurality of touch lines insulated from one another. The main body has a touch screen contact surface and a finger sliding surface. The plurality of control lines are located in the main body, the orthogonal projections of the plurality of control lines onto the touch screen contact surface are parallel to one another, and the plurality of control lines are located in the same plane, the plane where the plurality of control lines are located is not coplanar with the finger sliding surface. The plurality of touch lines are parallel to one another and located in the finger sliding surface, the plurality of touch lines are connected to the plurality of control lines in a one-to-one correspondence.

In the touch control auxiliary apparatus provided by the embodiments of the present disclosure, the plurality of touch lines are arranged on the finger sliding surface of the main body. When a user performs a sliding operation on the plurality of touch lines with a finger, electrical signals can be generated and transmitted to the control lines connected to the touch lines, which would in turn affect the capacitance generated by the control lines and touch electrodes of the capacitive touch screen, thereby achieving the control over the touch screen. That is, the touch control auxiliary apparatus can allow a user to implement a sliding operation on the touch screen without directly touching the touch screen with a finger.

Optionally, the finger sliding surface may be a planar surface or a non-planar surface, such as a curved surface. The cases in which the plane where the plurality of control lines are located is non-coplanar with the finger sliding surface include any of the followings: in a first case, the finger sliding surface is a planar surface, and the finger sliding surface intersects with (e.g., is perpendicular to) the plane where the plurality of control lines are located; in a second case, the finger sliding surface is a planar surface, and the finger sliding surface is parallel to the plane where the plurality of control lines are located; and in a third case, the finger sliding surface is a non-planar surface, such as a curved surface.

The first case is illustrated below with reference to FIGS. 1 to 8. The second case is illustrated with reference to FIGS. 9 and 10.

Figure 1:
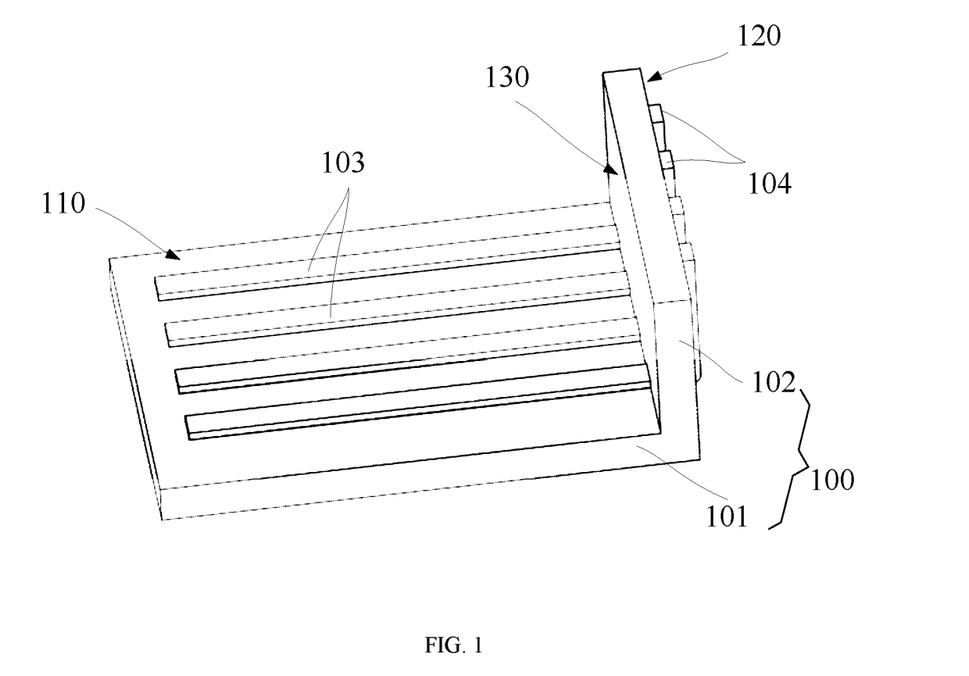
FIG. 1 is a schematic structural diagram of a touch control auxiliary apparatus provided by embodiments of the present disclosure.
Figure 2:
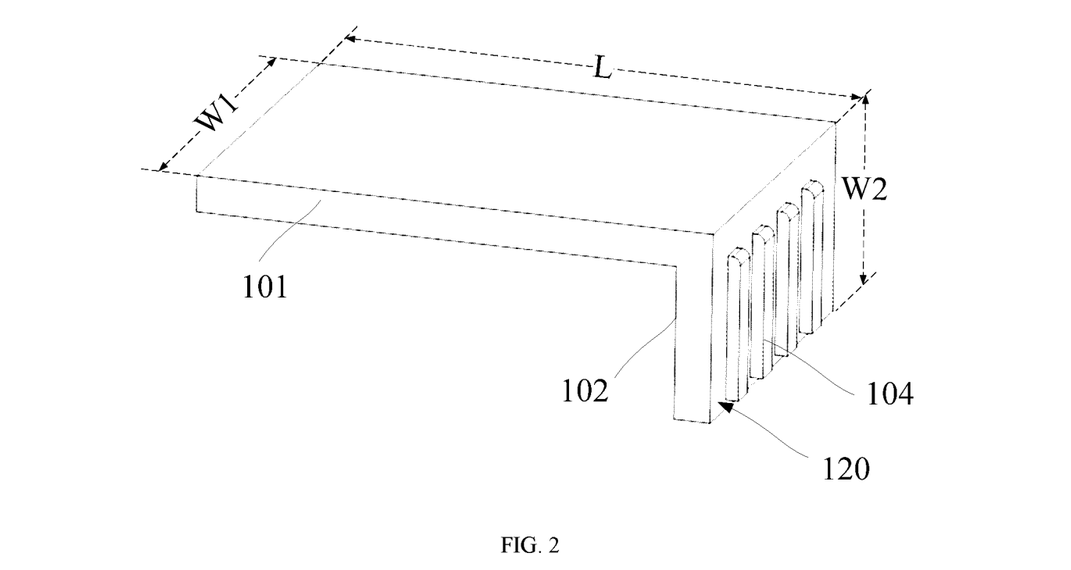
FIG. 2 is a schematic diagram of the touch control auxiliary apparatus provided in FIG. 1 from another visual perspective.

FIG. 1 is a schematic structural diagram of a touch control auxiliary apparatus provided by embodiments of the present disclosure. FIG. 2 is a schematic diagram of the touch control auxiliary apparatus provided in FIG. 1 from another visual perspective. Referring to FIGS. 1 and 2, the touch control auxiliary apparatus includes: a cover plate 101, a side wall 102, a plurality of control lines 103 insulated from one another and a plurality of touch lines 104 insulated from one another. The cover plate 101 has a contact surface which is in contact with a touch screen of a mobile terminal, that is, a touch screen contact surface 110. The side wall 102 intersects with the cover plate 101 and is disposed at an angle with the cover plate 101. The side wall 102 has a finger sliding surface 120. The plurality of control lines 103 are embedded in the cover plate 101 in parallel, the plurality of touch lines 104 are embedded in the finger sliding surface 120 of the side wall 102 in parallel, and the plurality of touch lines 104 are connected to the plurality of control lines 103 in a one-to-one correspondence.

In some embodiments of the present disclosure, the touch screen is a capacitive touch screen. When a user touches the touch lines of the side wall of the touch control auxiliary apparatus, electrical signals can be generated and transmitted to the control lines, which can affect the capacitance generated by the control lines and touch electrodes of the capacitive touch screen, thereby achieving the control over the touch screen.

In some embodiments of the present disclosure, by designing the side wall located on the side surface of the mobile terminal, providing the plurality of touch lines in parallel in the finger sliding surface of the side wall and then providing the plurality of control lines in parallel in the cover plate, the cover plate is attached to the touch screen of the mobile terminal, the plurality of touch lines are connected to the plurality of control lines in a one-to-one correspondence. As such, when a user touches the touch lines of the side wall, electrical signals can be generated and transmitted to the control lines, which affects the capacitance generated by the control lines and touch electrodes of the touch screen, thereby achieving the control over the touch screen. In this case, as the user's finger operates on the side surface of the mobile terminal when the user performs a touch operation, the touch screen would not be shielded and thus important information displayed on the touch screen would not be shielded. In addition, the touch control auxiliary apparatus is simple in structure, and is low in implementation cost compared with side-surface touch control that is implemented by making adjustments on the touch screen, including a circuit.

It should be noted that, in addition to the mobile terminal, the touch screen contact surface 110 may also be configured to be attached to other electronic devices with a touch screen.

In some embodiments shown in FIG. 1 and FIG. 2, the side wall 102 is a flat plate, which is an implementation form of the shape of the side wall in the embodiment of the present disclosure. In other embodiments, the side wall may be a curved plate. It should be noted that the side wall may be a non-plate structure. For example, the finger sliding surface of the side wall may be a convex curved surface, and a surface opposite to the finger sliding surface is a planar surface. Alternatively, the finger sliding surface of the side wall may be a planar surface, and a surface opposite to the finger sliding surface is a concave curved surface. The following descriptions of the side wall 102 can be combined and applied to side walls of other shapes.

Here, the one-to-one corresponding connection between the plurality of touch lines 104 and the plurality of control lines 103 means that the plurality of touch lines 104 are arranged from one side to the other side in a certain direction, and each of them being sequentially connected with one of the plurality of control lines 103 which are also arranged in a certain direction. The arrangement direction of the control lines 103 is not limited. For example, as shown in FIG. 1, the four touch lines 104, being arranged from top to bottom, sequentially connect to the four control lines 103 which are also arranged from top to bottom.

Optionally, the plane where the control lines are located may intersect with the finger sliding surface. Exemplarily, as shown in FIGS. 1 and 2, the side wall 102 and the cover plate 101 are angularly connected. The touch screen contact surface 110 is one surface of the cover plate 101 and the finger sliding surface 120 is one surface of the side wall 102, and the touch screen contact surface 110 intersects with the finger sliding surface 120.

In some embodiments of the present disclosure, the side wall 102 has a contact surface opposite to the finger sliding surface 120. The side wall 102 may be attached to the side surface of the mobile terminal through the contact surface, which then, may be referred to as a side wall contact surface 130. The side wall contact surface 130 is in contact with the touch screen contact surface 110. In this way, the finger sliding surface 120 is an outward-facing surface of the side wall (that is, a surface away from the mobile terminal), which is convenient for a user to perform a touch operation. In other embodiments, there may be a gap between the side wall 102 and the side surface of the mobile terminal. In this case, the finger sliding surface of the side wall 102 may be provided on a surface facing the mobile terminal, or on a surface facing away from the mobile terminal.

In some embodiments, the length direction (i.e., the extending direction) of the control lines 103 may intersect with the finger sliding surface 120.

In a possible implementation manner, the control lines 103 may be connected to the corresponding touch lines 104 through connection lines. Exemplarily, in the embodiment shown in FIG. 1, the touch lines 104 are connected to the corresponding control lines 103 through connection lines (not shown in FIG. 1), and the connection lines are located inside the side wall 102. By connecting the touch lines 104 and the control lines 103 through the connection lines, and disposing the connection lines as being inside the side wall 102, the user can avoid accidentally touching the connection lines and causing a wrong operation.

In another possible implementation manner, the control lines 103 may also be directly connected to the corresponding touch lines 104. For example, when the touch screen contact surface 110 is in direct contact with the finger sliding surface 120, the control lines 103 located on the touch screen contact surface 110 may be directly connected to the touch lines 104 located on the finger sliding surface 120.

In other embodiments, the length direction of the control lines 103 may also be parallel to the finger sliding surface 120, as long as the connection lines being arranged to connect the corresponding control lines with the touch lines.

Exemplarily, a distance between every two adjacent control lines 103 is less than a width of a touch electrode in the touch screen. For example, the distance between every two adjacent control lines 103 is not greater than 3.5 mm, and may even be less than 3.5 mm. For example, the distance may be designed to be 0.5 mm, 0.3 mm, etc., to ensure the touch control accuracy. Of course, by designing the distance between every two control lines to be smaller, the touch control accuracy can be further ensured.

Exemplarily, a width of each control line 103 may be less than 3.5 mm, and exemplarily may be between 0.2 mm to 0.5 mm, such as 0.5 mm, 0.3 mm, etc.

Optionally, a distance between every two adjacent touch lines 104 may be equal to the distance between every two adjacent control lines 103, as exemplified by the embodiment shown in FIG. 1. Alternatively, the distance between every two adjacent touch lines 104 may also be different from the distance between every two adjacent control lines 103. For example, the distance between every two adjacent touch lines 104 may be less than the distance between every two adjacent control lines. The distance between every two adjacent touch lines 104 may be set according to the size of the finger sliding surface. The width of each touch line 104 may be equal to the width of each control line 103.

In the embodiments shown in FIGS. 1 and 2, the control lines 103 are embedded in the touch screen contact surface 110. That is, the control lines 103 are located in the touch screen contact surface 110, and parts of the control lines 103 are exposed from the touch screen contact surface 110. In an implementation manner, parts of the control lines 103 protrude from the touch screen contact surface 110, and the exposed parts may be as shown in FIG. 1. In another implementation manner, a surface of the control line 103 is exposed, and the exposed surface of the control lines 103 is flush with the touch screen contact surface 110, so that the touch screen contact surface 110 can completely fit against the touch screen. In the above two implementation manners, the control lines 103 can completely fit against the touch screen of the mobile terminal, thereby ensuring a better control of the control lines over the touch screen.

Alternatively, in other embodiments, the control lines 103 may be provided inside the cover plate 101, so that the touch screen contact surface 110 can be fully attached to the touch screen, and meanwhile can protect the control lines 103, thereby achieving a better touch control effect. In this case, the cover plate should be thin enough or the distance between the control lines and the contact surface should be small enough.

Optionally, if the control lines 103 are located inside the cover plate 101, the plane where the control lines 103 are located may be parallel to the touch screen contact surface 110, or may be provided at a certain angle with the touch screen contact surface 110. The included angle range may be relatively small, thereby preventing the control lines 103 from being too long, which may in turn result in a thick cover plate 101.

Considering that the touch lines 104 need to be in contact with a user's finger, the touch lines 104 are thus embedded in the finger sliding surface 120. In an implementation manner, parts of the touch lines 104 are exposed from the side wall 102, that is, protrude from the finger sliding surface 120, and the exposed parts may be as shown in FIG. 1. In another implementation manner, a surface of the touch line 104 may be exposed, and the exposed surface of the touch line 104 may be flush with the finger sliding surface 120 of the side wall 102.

Exemplarily, the cover plate 101 may be a transparent cover plate to avoid shielding a display area of the touch screen with a display function. Alternatively, the cover plate 101 may also be an opaque cover plate. The opaque cover plate is suitable for a touch screen which has a display function and has a screen area being much larger than the area of the region covered by the cover plate 101, and is also suitable for a touch screen without a display function.

Exemplarily, the control lines 103 may be transparent conductive lines, thereby ensuring the transparency of the entire transparent cover plate and avoiding shielding the screen. For example, the control lines 103 may be made of indium tin oxide to obtain transparent conductive lines. The touch lines 104 may be made of the same material as that of the control lines 103, or may be made of a different material, such as a non-transparent material.

In other embodiments, the control lines 103 and the touch lines 104 may also be made of metal materials, such as copper lines, etc., which is not limited in the present disclosure.

As shown in FIGS. 1 and 2, in an implementation manner, the cover plate 101 and the side wall 102 are vertically connected to form the main body 100, which has an L-shaped structure. An angle between the side wall 102 and the cover plate 101 may be 90 degrees, so that the cover plate 101 would be attached closely to the touch screen of the mobile terminal, and the side wall 102 attached to the side surface of the mobile terminal. In other implementation manners, the angle between the side wall 102 and the cover plate 101 may be greater than or less than 90 degrees, which is not limited in the present disclosure.

Referring to FIGS. 1 and 2, the cover plate 101 and the side wall 102 may both be rectangular in shape. In other implementation manners, the cover plate 101 and the side wall 102 may also be in other shapes, such as trapezoidal, semi-circular, etc., which is not limited in the present disclosure.

In some embodiments of the present disclosure, the length L of the cover plate 101 may be less than the width of the touch screen, and the width W1 of the cover plate 101 is less than the length of the touch screen. For example, the width W1 of the cover plate 101 may be ⅕-⅓ of the length of the touch screen. This design can reduce the influence of the cover plate 101 on the display of the touch screen. The width W2 of the side wall 102 is less than or equal to the thickness of the mobile terminal (that is, the width of the side surface of the mobile terminal). The length of the side wall is not limited in the present disclosure, and may be designed according to the size of the side wall 102.

In other embodiments, the cover plate 101 and the side wall 102 may also be designed with other sizes, for example, the length L of the cover plate 101 may be equal to or greater than the width of the touch screen; for example, the width W2 of the side wall 102 may be greater than the thickness of the mobile terminal; for example, the width W1 of the cover plate 101 may be equal to or greater than the length of the touch screen, which are not limited in the present disclosure.

Exemplarily, the cover plate 101 may be a transparent cover plate. That is, the cover plate 101 may be made of transparent material, such as resin or other transparent polymer materials. As such, the transparency property of the cover plate 101 can be guaranteed on the one hand, and the mass of the entire apparatus would be relatively small on the other hand. In addition, by using insulating transparent material to produce the cover plate 101, there would be no short circuit among the plurality of control lines 103. The side wall 102 may be made of a transparent or non-transparent material, and the transparent or non-transparent material used to produce the side wall 102 is an insulating material, so that there would be no short circuit among the plurality of touch lines 104. In order to realize the integrated design of the cover plate 101 and the side wall 102 and facilitate processing, the side wall 102 may be produced with the same material as that of the cover plate 101.

Optionally, when the cover plate 101 and the side wall 102 are made of resin or other transparent polymer materials, the cover plate 101 and the side wall 102 may be made into a film structure. As such, the entire touch control auxiliary apparatus would be in the form of a protective film configured to be attached to the surface of the mobile terminal.

Referring again to FIG. 1, the length direction of the touch lines 104 and the length direction of the control lines 103 are perpendicular to each other. Exemplarily, the control lines 103 are arranged in the length direction of the cover plate 101. The length direction of the cover plate 101 is perpendicular to the side wall 102. That is, the length direction of the control lines 103 is perpendicular to the side wall 102, so that the plurality of control lines 103 may generate a signal by vertically sliding on the touch screen, thereby facilitating a user to perform operations of page turning or refreshing. Of course, in other implementation manners, the control lines 103 may also be arranged in a width direction of the cover plate 101, that is, the length direction of the control lines 103 and the side surface of the mobile terminal may be parallel to each other. Here, the length direction of the cover plate 101 is parallel to a row direction (the extending direction of grid lines) of the touch screen, and the width direction of the cover plate 101 is parallel to a column direction (the extending direction of data lines) of the touch screen.

The plurality of touch lines 104 are arranged at intervals along the length direction of the side wall 102. In this case, the user performs a touch operation by sliding a finger on the finger sliding surface 120. Here, the length direction of the side wall 102 is parallel to the width direction of the cover plate 101.

The length of control lines 103 may differ from the length of the touch screen contact surface 110 by only a small difference (the difference between the two lengths is less than a set value (e.g., 1 mm)). For example, the two lengths may be equal, so that the control lines 103 may be sufficiently overlapped with the touch screen, thereby ensuring that the touch control over the touch screen can be enabled. The length of touch lines 104 may be less than the width W2 of the side wall 102, and the touch lines 104 may be disposed in a middle region of the side wall 102, so that the user can touch conveniently.

Figure 3:
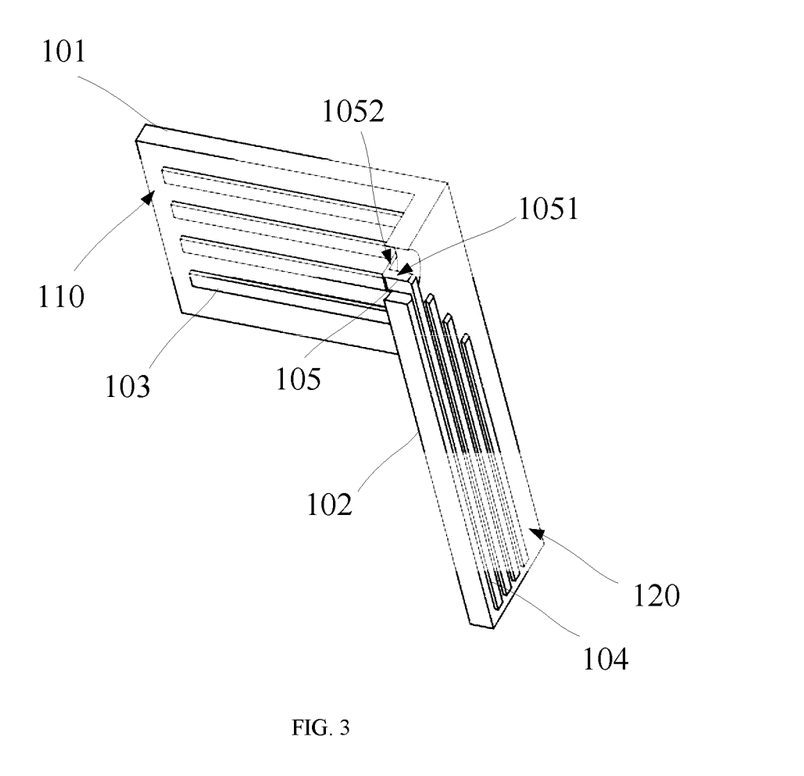
FIG. 3 is a schematic structural diagram of another touch control auxiliary apparatus provided by embodiments of the present disclosure.
Figure 4:
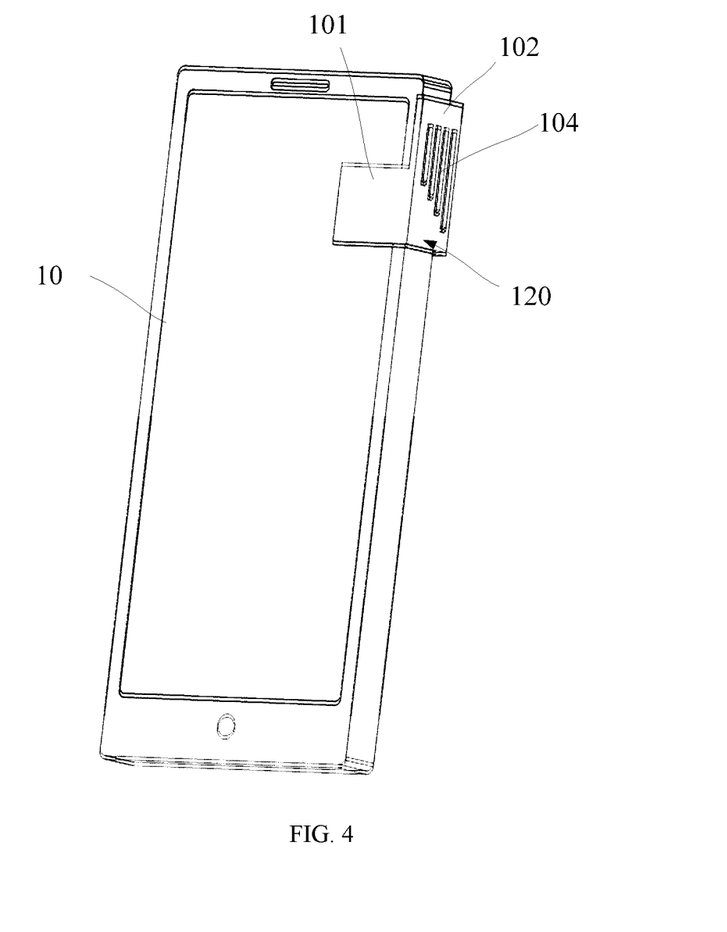
FIG. 4 is a schematic diagram showing the use of the touch control auxiliary apparatus provided in FIG. 3.

FIG. 3 is a schematic structural diagram of another touch control auxiliary apparatus provided by embodiments of the present disclosure. FIG. 4 is a schematic diagram showing the use of the touch control auxiliary apparatus provided in FIG. 3. Referring to FIG. 3 and FIG. 4, the touch control auxiliary apparatus differs from the touch control auxiliary apparatus provided in FIG. 1 in the arrangement direction of the touch lines 104. The plurality of touch lines 104 are arranged at intervals along the width direction of the side wall 102 (that is, a direction in perpendicular to the cover plate 101). That is, the length direction of the touch lines 104 is parallel to the cover plate 101. As such, the user can perform a touch operation long a transverse direction of the finger sliding surface 120 without bending a thumb joint when touching. It is simple to operate, and there would be no discomfort or even lesion due to the bending of the thumb joint, which is more healthy and comfortable.

Referring to FIG. 4, the touch control auxiliary apparatus is attached to the mobile terminal 10, and the user can touch the plurality of touch lines 104 in the transverse direction of the finger sliding surface 120. In order to facilitate the arrangement of the touch lines 104, the length of the side wall 102 of the touch control auxiliary apparatus shown in FIG. 4 is greater than the length of the side wall 102 of the touch control auxiliary apparatus shown in FIG. 1. The side edge of the cover plate 101 constitutes a part of the side edge of the side wall 102.

Referring to FIG. 3, the touch lines 104 are connected to the corresponding control lines 103 through connection lines. A portion 1051 of the connection lines 105 are located inside the side wall 102 (the notch in FIG. 3 is only used to show the connection lines 105, and does not exist actually). The other portion 1052 of the connection lines 105 are disposed on the side wall contact surface 130. That is, the connection lines 105 have a first portion 1051 located inside the side wall 102 and a second portion 1052 located on the side wall contact surface 130. By arranging the connection lines inside the side wall and on the contact surface, instead of being exposed from the finger sliding surface of the side wall, the user can be prevented from touching the connection portions by mistake. The connection lines 105 may be made of the same material as the touch lines 104 or the control lines 103. The thickness of the connection lines 105 may also be the same as that of the touch lines 104 or the control lines 103. The control lines 103, the touch lines 104 and the connection lines 105 shown in FIG. 3 are merely schematic, and are not intended to represent the thickness.

In an implementation manner, the lengths of the plurality of touch lines 104 are not equal. As shown in FIG. 3, one ends of the plurality of touch lines 104, which are connected to the connection lines 105, are arranged in a step style, and the other ends of the plurality of touch lines 104 are aligned. Alternatively, in another implementation manner, the lengths of the plurality of touch lines 104 are equal, which is convenient for a user to perform a touch operation on the plurality of touch lines 104. In this way, the relatively long touch lines 104 in FIG. 3 can be shortened, and the second portions 1052 of the corresponding connection lines 105 located on the side wall contact surface 130 can be prolonged.

In FIG. 1 to FIG. 4, the numbers of the control lines 103, the touch lines 104 and the connection lines 105 are merely schematic, and are not intended to limit the present disclosure.

Exemplarily, the cover plate 101 and the side wall 102 are rotatably connected, for example, hinged. Through the rotatable connection, the included angle between the side wall and the cover plate can be adjusted, so that the apparatus can be applied to mobile terminals of different shapes and sizes.

In the embodiments of the present disclosure, the touch screen contact surface 110 may have adhesiveness, or the touch screen contact surface 110 may have a non-slip structure. As such, the friction between the cover plate and the touch screen can be increased to prevent the entire apparatus from moving during the touch operation.

Optionally, the touch screen contact surface 110 may also have adhesiveness or have a non-slip structure. The adhesiveness can be realized by providing an adhesive material (such as glue) on the touch screen contact surface 110. The non-slip structure may be a plurality of raised structures distributed on the touch screen contact surface 130.

Figure 5:
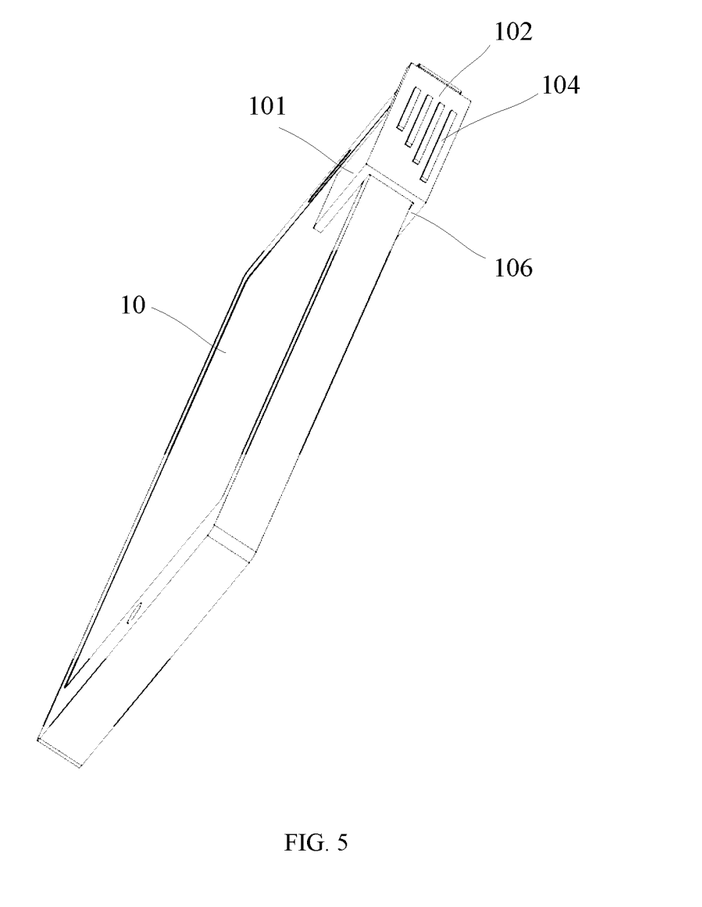
FIG. 5 is a schematic diagram showing the use of the touch control auxiliary apparatus provided in FIG. 3 from another visual perspective.
Figure 6:
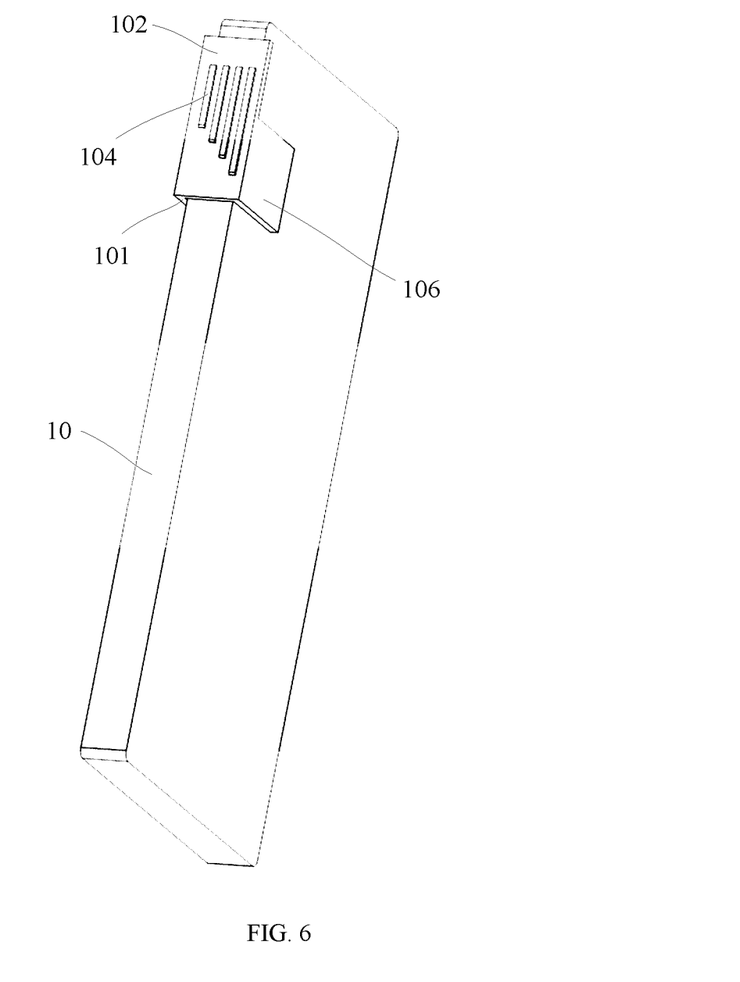
FIG. 6 is a schematic diagram showing the use of the touch control auxiliary apparatus provided in FIG. 3 from yet another visual perspective.

FIG. 5 is a schematic diagram showing the use of another touch control auxiliary apparatus provided by embodiments of the present disclosure. FIG. 6 is a schematic diagram of the touch control auxiliary apparatus provided in FIG. 5 from another visual perspective. Referring to FIG. 5 and FIG. 6, compared to the structure in FIG. 1 or FIG. 3, the touch control auxiliary apparatus further includes a fixing structure, configured to fix the touch control auxiliary apparatus on the mobile terminal 10. By designing the fixed structure, the apparatus can be fixed on the mobile terminal, thereby ensuring the effect of the side-surface touch operation.

Exemplarily, the fixing structure may include a clamping portion. The clamping portion and the main body constitute a U-shaped structure together. Exemplarily, as shown in FIG. 5, the clamping portion 106 is connected to the side wall 102, and the clamping portion 106 and the cover plate 101 are located on two opposite side edges of the side wall 102, respectively. The clamping portion 106, the side wall 102 and the cover plate 101 constitute a U-shaped structure. By connecting the clamping portion to the other side of the side wall, the entire apparatus constitutes a U-shaped structure, which ensures a fixed effect on the mobile terminal. As shown in FIG. 6, the fixing structure 106 is attached to the back surface of the mobile terminal 10 and cooperates with the cover plate 101 to clamp the mobile terminal 10.

Further, the clamping portion 106 is a flexible component. By means of the flexible design, the touch control auxiliary apparatus can be clamped onto the mobile terminal conveniently, and can thus be applied to mobile terminals of different thicknesses. Exemplarily, the flexible component may be an elastic component, or the like.

FIGS. 5 and 6 are only examples of a fixing structure, and other structures may also be used as a fixing structure, for example, the fixing structure may be a suction cup fixing structure that is fixed to the back surface of the mobile terminal by suction, or a magnet fixing structure that is fixed to the back surface of the mobile terminal through a magnetic force, which is not limited in the present disclosure.

Optionally, in some embodiments, the main body may also be in a blocky structure, such as a polyhedron structure. Exemplarily, the polyhedron structure includes, but is not limited to, a cuboid, a cube, a prism, a trapezoidal table, and the like.

Figure 7:
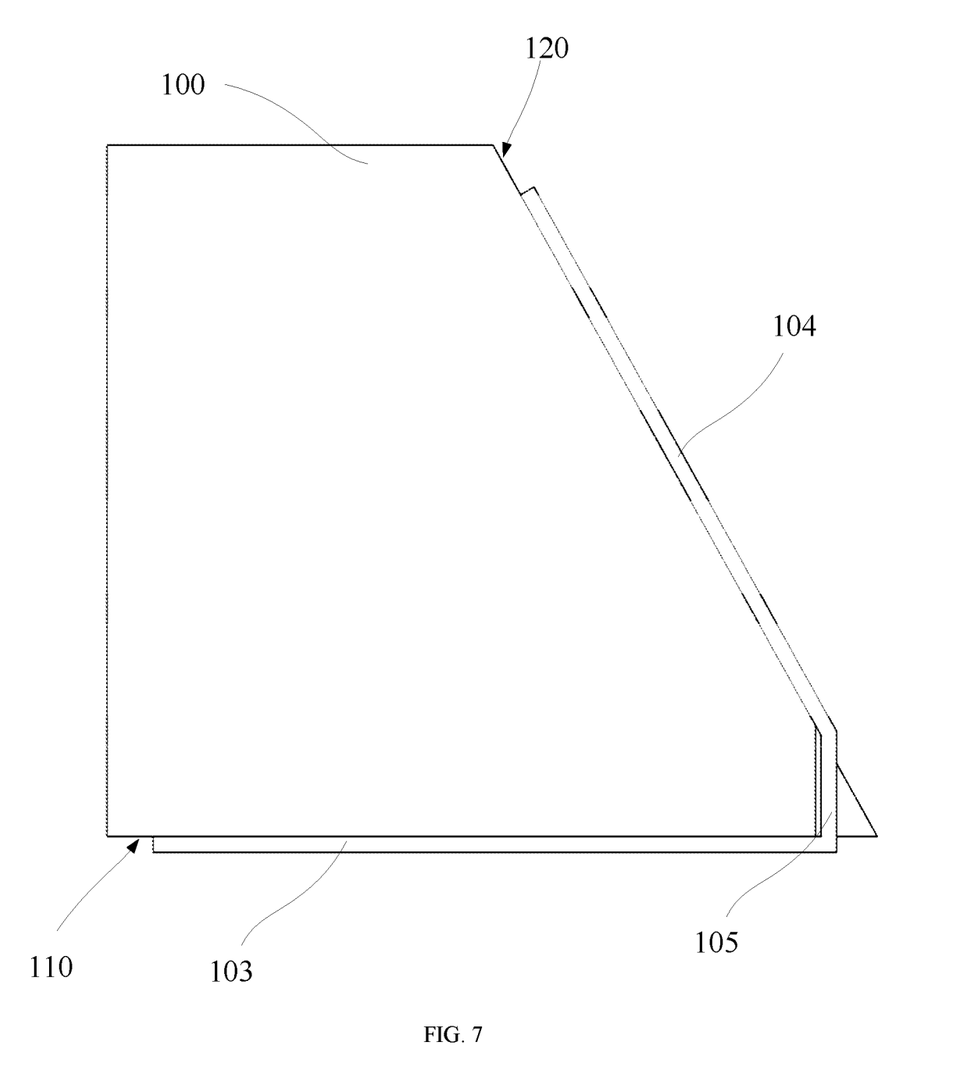
FIG. 7 is a schematic structural side view of another touch control auxiliary apparatus according to embodiments of the present disclosure.
Figure 8:
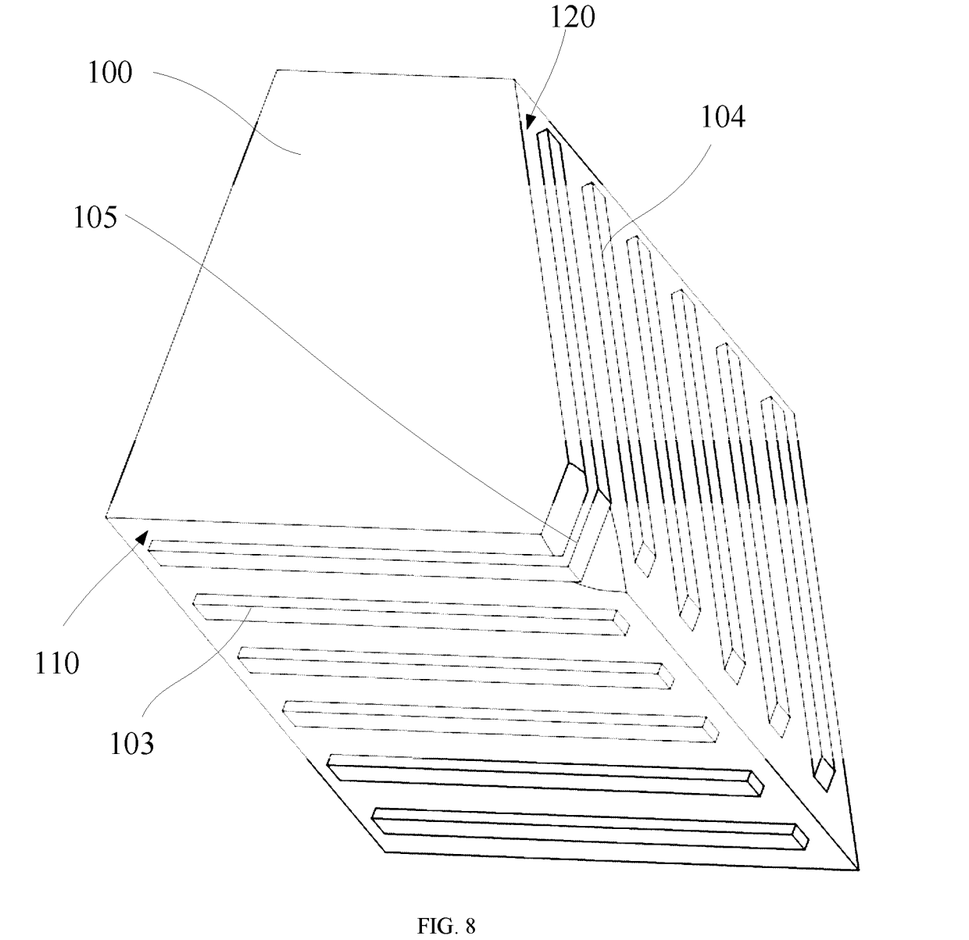
FIG. 8 is a schematic stereoscopic structural diagram of the touch control auxiliary apparatus provided in FIG. 7.

FIG. 7 is a schematic structural side view of another touch control auxiliary apparatus provided by embodiments of the present disclosure. FIG. 8 is a schematic stereoscopic structural diagram of the touch control auxiliary apparatus shown in FIG. 7. Exemplarily, as shown in FIG. 7, the main body 701 is of a trapezoidal table structure. The trapezoidal table structure has a bottom surface (i.e., the touch screen contact surface 110), a top surface opposite to the bottom surface, and a side surface connecting the bottom surface and the top surface. Optionally, all the side surfaces may be provided at an acute angle with the bottom surface, respectively. Alternatively, a part of the side surfaces may be provided at an acute angle with the bottom surface respectively, and the remaining part of the side surfaces may be set at a right angle with the bottom surface respectively. One of the side surfaces forming an acute angle with the bottom surface respectively is the finger sliding surface 120.

The plurality of control lines 103 are arranged in parallel on the touch screen contact surface 110, and therefore the orthographic projections of the plurality of control lines 103 onto the touch screen contact surface 110 are also parallel to one another. The plurality of touch lines 104 are arranged in parallel on the finger sliding surface 120. The touch lines 103 are connected to the corresponding touch lines 104 through the connection lines 105.

With respect to other descriptions of the control lines 103 and the touch lines 104 in the embodiment shown in FIG. 7 and FIG. 8, references can be made to the related descriptions in FIG. 1 to FIG. 6, and details are not repeated here.

Optionally, the main body of the polyhedron structure may also be connected with a fixing structure. Exemplarily, the fixing structure may be L-shaped and connected with the intersection between the finger sliding surface and the touch screen contact surface, so that the main body and the fixing structure constitute a U-shaped structure together. Exemplarily, the fixing structure may be a flexible component. Alternatively, the fixing structure is a suction cup fixing structure that is fixed to the back surface of the mobile terminal by suction, or a magnet fixing structure that is fixed to the back surface of the mobile terminal through a magnetic force, which is not limited in the present disclosure.

It should be noted that in the case where the main body is a polyhedron structure, the control lines and the touch lines may be connected through the connection lines. Exemplarily, as shown in FIGS. 7 and 8, the connecting lines 105 are located in the main body 100. Alternatively, if the control lines and the touch lines are respectively located at two connected surfaces of the polyhedron structure, the control lines and the touch lines may also be directly connected.

In addition, in the embodiments shown in FIG. 7 and FIG. 8, the touch screen contact surface 110 and the finger sliding surface 120 are two adjacent surfaces of the polyhedron structure. In other embodiments, the touch screen contact surface and the finger sliding surface may also be two opposite surfaces of the polyhedron structure. For example, the top surface of the trapezoidal table may be the finger sliding surface, and the bottom surface of the trapezoidal table may be the touch screen contact surface. In this case, the thickness of the body needs to be relatively thick to isolate a direct operation of the finger on the touch screen.

Figure 9:
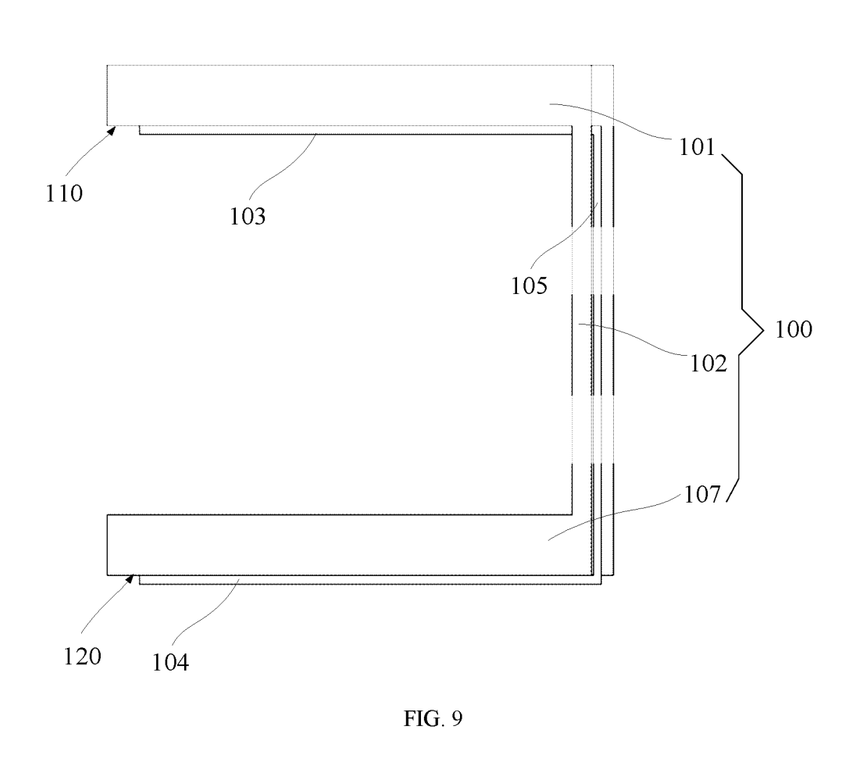
FIG. 9 is a schematic structural side view of another touch control auxiliary apparatus according to embodiments of the present disclosure.
Figure 10:
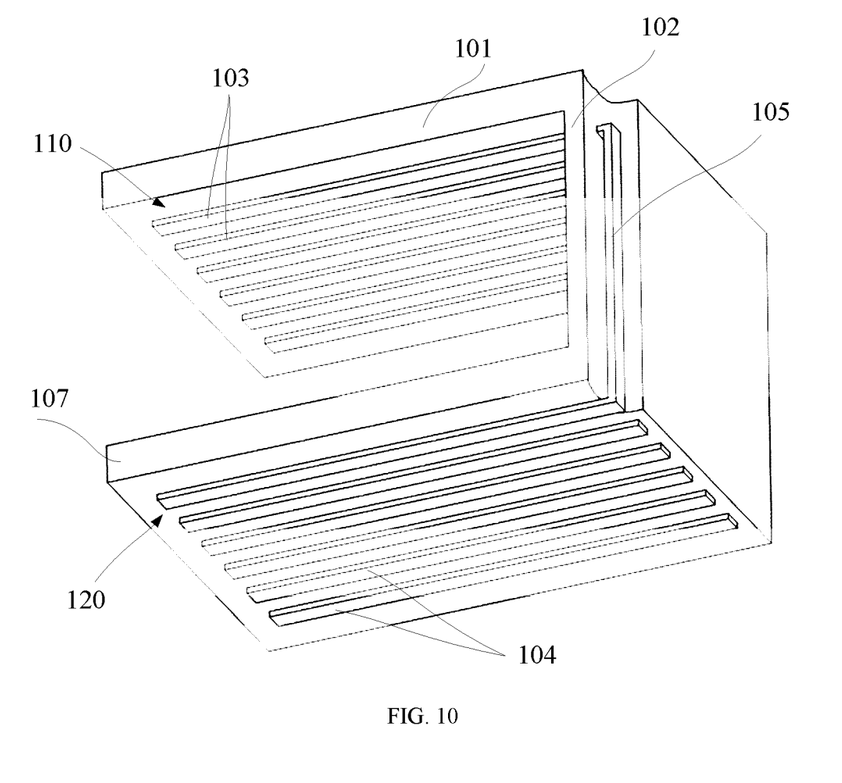
FIG. 10 is a schematic stereoscopic structural diagram of the touch control auxiliary apparatus provided in FIG. 9.

FIG. 9 is a schematic structural side view of another touch control auxiliary apparatus provided by embodiments of the present disclosure. FIG. 10 is a schematic stereoscopic structure diagram of the touch control auxiliary apparatus provided in FIG. 9. Referring to FIGS. 9 and 10, the body 100 includes a cover plate 101, a side wall 102, and a back plate 107. The cover plate 101 and the back plate 107 are respectively connected to two opposite side edges of the side wall 102, and the cover plate 101 and the back plate 107 are located on the same side of the side wall 102, the touch screen contact surface 110 is a surface of the cover plate 101 close to the back plate 107, and the finger sliding surface 120 is a surface of the back plate 107 away from the cover plate 101.

The plurality of control lines 103 are arranged in parallel on the touch screen contact surface 110, and therefore the orthographic projections of the plurality of control lines 103 onto the touch screen contact surface 110 are also parallel to one another. The plurality of touch lines 104 are arranged in parallel on the finger sliding surface 120. The touch lines 103 are connected to the corresponding touch lines 104 through the connection lines 105. Exemplarily, the connection lines 105 are located in the side wall 102.

Exemplarily, the cover plate 101, the side wall 102, and the back plate 107 may be integrally molded using the same material.

With respect to other descriptions of the cover plate 101, the side wall 102, the control lines 103 and the touch lines 104, references may be made to the embodiments shown in FIG. 1 to FIG. 6. Details descriptions are not repeated here.

In some embodiments, the touch lines 104 and the control lines 103 are parallel to one another. In this way, when the touch control auxiliary apparatus is placed on the right side of the mobile terminal, a user may perform a sliding operation on the finger sliding surface with a ring finger, which is convenient to operate. Alternatively, in other embodiments, the touch lines 104 may intersect with (e.g., be perpendicular to) the control lines 103.

The embodiments of the present disclosure further provide a protective casing, which includes the touch control auxiliary apparatus as described above.

The protective casing may have a mobile terminal accommodating groove. When the mobile terminal is installed in the mobile terminal accommodating groove of the protective casing, the touch screen contact surface of the touch control auxiliary apparatus is attached to the touch screen of the mobile terminal.

Exemplarily, the protective casing may be a mobile terminal protective casing, including but not limited to a mobile phone casing, a tablet computer casing, or the like.

Some embodiments of the present disclosure further provide a touch screen, which includes the touch control auxiliary apparatus as described above.

Here, the touch screen includes, but is not limited to, a liquid crystal display (LCD) touch screen, an organic light emitting diode (OLED) touch screen, or the like.

Some embodiments of the present disclosure further provide a mobile terminal, which includes the touch screen as described above.

Here, the mobile terminal includes, but is not limited to a mobile phone, a tablet computer, a smart bracelet, smart glasses, a vehicular terminal or other devices.

The foregoing descriptions are merely exemplary embodiments of the present disclosure, and are not used to limit the present disclosure. Within the spirit and principles of the disclosure, any modifications, equivalent substitutions, improvements, etc., are within the protection scope of the present disclosure.

What is claimed is:

1. A touch control auxiliary apparatus, comprising:
   a main body having a touch screen contact surface and a finger sliding surface;
   a plurality of control lines insulated from one another, wherein the plurality of control lines are embedded in the touch screen contact surface, orthogonal projections of the plurality of control lines onto the touch screen contact surface are parallel to one another, the plurality of control lines are located in a same plane, and the plane where the plurality of control lines are located is not coplanar with the finger sliding surface; and
   a plurality of touch lines insulated from one another, wherein the plurality of touch lines are located in the finger sliding surface and the plurality of touch lines are parallel to one another, and the plurality of touch lines are connected to the plurality of control lines in a one-to-one correspondence.

2. The touch control auxiliary apparatus according to claim 1, wherein the plane where the plurality of control lines are located intersects with the finger sliding surface.

3. The touch control auxiliary apparatus according to claim 2, wherein a length direction of the control lines intersects with the finger sliding surface.

4. The touch control auxiliary apparatus according to claim 3, wherein a length direction of the touch lines and the touch screen contact surface satisfy one of the following relationships: parallel and intersection.

5. The touch control auxiliary apparatus according to claim 1, wherein the finger sliding surface is a planar surface or a curved surface.

6. The touch control auxiliary apparatus according to claim 1, wherein the finger sliding surface is a planar surface, and the finger sliding surface is parallel to the plane where the plurality of control lines are located.

7. The touch control auxiliary apparatus according to claim 1, wherein the main body comprises a cover plate and a side wall, wherein the side wall meets the cover plate at one side edge of the cover plate, the touch screen contact surface (110) is a surface of the cover plate, and the finger sliding surface is a surface of the side wall.

8. The touch control auxiliary apparatus according to claim 7, wherein the side wall has a side wall contact surface opposite to the finger sliding surface, and the side wall contact surface is connected with the touch screen contact surface.

9. The touch control auxiliary apparatus according to claim 1, wherein the main body comprises a cover plate, a side wall, and a back plate; the cover plate and the back plate are connected to two opposite side edges of the side wall, respectively, and the cover plate and the back plate are located on a same side of the side wall; the touch screen contact surface is a surface of the cover plate close to the back plate; and the finger sliding surface is a surface of the back plate away from the cover plate.

10. The touch control auxiliary apparatus according to claim 7, wherein the touch lines are connected to corresponding control lines through connection lines, and the connection lined takes one of the following structures:
the connection lines are located inside the side wall; and
the connection lines have a first portion located inside the side wall and a second portion on the side wall contact surface.

11. The touch control auxiliary apparatus according to claim 7, wherein the cover plate is a transparent cover plate.

12. The touch control auxiliary apparatus according to claim 11, wherein the control lines are transparent conductive lines.

13. The touch control auxiliary apparatus according to claim 1, wherein the plane where the plurality of control lines and the touch screen contact surface satisfy one of the following relationships: parallel and coincidence.

14. The touch control auxiliary apparatus according to claim 1, wherein the touch screen contact surface take one of the following configurations:
the touch screen contact surface has adhesiveness; and
the touch screen contact surface has a non-slip structure.

15. The touch control auxiliary apparatus according to claim 1, further comprising a fixing structure connected to the main body, wherein the fixing structure is configured to fix the touch control auxiliary apparatus to an electronic device to which the touch screen belongs.

16. The touch control auxiliary apparatus according to claim 15, wherein the fixing structure comprises a clamping portion, and the clamping portion and the main body constitute a U-shaped structure together.

17. The touch control auxiliary apparatus according to claim 16, wherein the clamping portion is a flexible component.

18. A protective casing, comprising the touch control auxiliary apparatus, wherein the touch control auxiliary apparatus comprising:
a main body having a touch screen contact surface and a finger sliding surface;
a plurality of control lines insulated from one another, wherein the plurality of control lines are embedded in the touch screen contact surface, orthogonal projections of the plurality of control lines onto the touch screen contact surface are parallel to one another, the plurality of control lines are located in a same plane, and the plane where the plurality of control lines are located is not coplanar with the finger sliding surface; and
a plurality of touch lines insulated from one another, wherein the plurality of touch lines are located in the finger sliding surface and the plurality of touch lines are parallel to one another, and the plurality of touch lines are connected to the plurality of control lines in a one-to-one correspondence.

19. A touch screen, comprising the touch control auxiliary apparatus, wherein the touch control auxiliary apparatus comprising:
a main body having a touch screen contact surface and a finger sliding surface;
a plurality of control lines insulated from one another, wherein the plurality of control lines are embedded in the touch screen contact surface, orthogonal projections of the plurality of control lines onto the touch screen contact surface are parallel to one another, the plurality of control lines are located in a same plane, and the plane where the plurality of control lines are located is not coplanar with the finger sliding surface; and
a plurality of touch lines insulated from one another, wherein the plurality of touch lines are located in the finger sliding surface and the plurality of touch lines are parallel to one another, and the plurality of touch lines are connected to the plurality of control lines in a one-to-one correspondence.

20. A mobile terminal, comprising the touch screen according to claim 19.

* * * * *